US010019197B2

(12) United States Patent
Lee et al.

(10) Patent No.: US 10,019,197 B2
(45) Date of Patent: Jul. 10, 2018

(54) SEMICONDUCTOR SYSTEM AND OPERATING METHOD THEREOF

(71) Applicant: SK hynix Inc., Gyeonggi-do (KR)

(72) Inventors: Kyung-Min Lee, Gyeonggi-do (KR); Yong-Ju Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 223 days.

(21) Appl. No.: 14/996,407

(22) Filed: Jan. 15, 2016

(65) Prior Publication Data

US 2017/0083264 A1  Mar. 23, 2017

(30) Foreign Application Priority Data

Sep. 17, 2015  (KR) .......................... 10-2015-0131640

(51) Int. Cl.
*G06F 3/06* (2006.01)
(52) U.S. Cl.
CPC .......... *G06F 3/0659* (2013.01); *G06F 3/0613* (2013.01); *G06F 3/0679* (2013.01)
(58) Field of Classification Search
CPC .............................. G06F 3/0659; G06F 3/061
USPC ........................................................... 710/6
See application file for complete search history.

(56) References Cited

U.S. PATENT DOCUMENTS

| 7,543,102 | B2 | 6/2009 | Jacob et al. |
| 7,698,498 | B2 | 4/2010 | Lakshmanamurthy et al. |
| 8,245,232 | B2* | 8/2012 | Mutlu ................. G06F 13/1663 712/214 |
| 8,819,379 | B2* | 8/2014 | Aho ....................... G06F 12/02 711/104 |
| 9,256,369 | B2* | 2/2016 | Nazm Bojnordi .... G06F 3/0611 |
| 9,432,298 | B1* | 8/2016 | Smith ................. H04L 49/9057 |
| 9,489,321 | B2* | 11/2016 | O'Connor ........... G06F 13/1626 |
| 9,542,352 | B2* | 1/2017 | Rajan ..................... G06F 13/28 |
| 9,588,810 | B2* | 3/2017 | Mutlu .................. G06F 9/4881 |
| 2016/0162200 | A1* | 6/2016 | Shin ...................... G06F 3/0611 711/169 |

* cited by examiner

*Primary Examiner* — Brian T Misiura
(74) *Attorney, Agent, or Firm* — IP & T Group LLP

(57) ABSTRACT

A semiconductor system may include: a command queue suitable for storing a plurality of requests provided from a host according to rank and bank information of the requests; one or more determination units suitable for determining requests having a same row address in response to row address information of the requests stored in the command queue; an arbitration unit suitable for scheduling the plurality of requests according to internal priorities of the requests; a monitoring unit suitable for providing the rank information and row hit information of the plurality of requests outputted according to the scheduling result of the arbitration unit, to the arbitration unit; a command generation unit suitable for generating a plurality of commands corresponding to and in response to the plurality of requests outputted according to the scheduling result of the arbitration unit; and a semiconductor memory device suitable for performing an internal operation in response to the command, wherein the arbitration unit reschedules the plurality of requests in response to a monitoring result of the monitoring unit and output results of the plurality of determination units, such that all requests inputted during a preset period are processed.

17 Claims, 5 Drawing Sheets

SEMICONDUCTOR SYSTEM AND OPERATING METHOD THEREOF

CROSS-REFERENCE TO RELATED APPLICATIONS

The present application claims priority of Korean Patent Application No. 10-2015-0131640, filed on Sep. 17, 2015, which is incorporated herein by reference in its entirety.

BACKGROUND

1. Field

Exemplary embodiments of the present invention relate generally to a semiconductor design technology, and more particularly, to a semiconductor system for controlling command scheduling and an operating method thereof.

2. Description of the Related Art

In a semiconductor system having a multi-rank structure, a memory controller may perform a scheduling operation to generate a command corresponding to a request having a higher priority among read or write requests from a host. A semiconductor system performing such an operation will be described with reference to FIG. 1.

FIG. 1 is a configuration diagram illustrating a conventional semiconductor system.

Referring to FIG. 1, the semiconductor system may include a host 110, a command queue 120, an arbitration unit 140, a command generation unit 150, and a semiconductor memory device 160.

The command queue 120, the arbitration unit 140, and the command generation unit 150 may be incorporated in one memory controller.

The command queue 120 may include an address mapping unit 121. The command queue 120 may include a plurality of command queues 131 to 133. The address mapping unit 121 may receive a plurality of requests REQ from the host 110. The address mapping unit 121 may convert physical addresses corresponding to each of the received requests REQ into logical addresses. For example, the address mapping unit 121 may perform an exclusive disjunction operation XOR on the physical addresses and corresponding key data. The addresses outputted from the address mapping unit 121 may include commands and/or addresses CMD/ADD. The addresses may include rank, bank, column, and row addresses. The commands may be or include a read, write, and/or erase command.

The plurality of command queues 131 to 133 can sequentially store the requests containing the command and address information outputted from the address mapping unit 121 according to bank and rank information contained in the requests.

The arbitration unit 140 may perform a scheduling operation to preferentially output a request having a higher priority depending on scoring values of the plurality of requests stored in the command queue 120. A scoring value may be obtained by combining QOS (Quality of Service), seniority, and row hit information for the respective requests. The seniority information may indicate how long a request has been stored in the command queue 120. The row hit information may indicate whether a corresponding request has the same row address as a previous request or an immediately previous request.

The arbitration unit 140 may determine the priorities of a plurality of requests based on their respective scoring values. The arbitration unit 140 may then sequentially output the requests according to their respective determined priorities.

The command generation unit 150 may generate a plurality of commands corresponding to each of the requests which are sequentially outputted from the arbitration unit 140. The command generation unit 150 may output the plurality of commands via an interface to a semiconductor memory device. The semiconductor memory device 160 may receive a command generated by the command generation unit 150 via the interface. The semiconductor memory device 160 may perform a command operation based on the command received.

In short, the memory controller may schedule the plurality of requests received from the host 110 based on the scoring values of the requests, and generate a command according to the priorities of the requests. The semiconductor memory device 160 may perform an internal operation in response to the command.

For example, a DDR4 semiconductor memory device may receive six commands from an external device during 35 ns, but allow only four activations during 35 ns due to a tFAW (Four-bank activation window) restriction. Thus, although the memory controller may output the six commands, the semiconductor memory device 160 may be activated to perform an operation according to the former four commands. However, the semiconductor memory device 160 cannot perform an operation corresponding to the latter two commands. Thus, the semiconductor memory device 160 may generate a performance overhead of 33%.

SUMMARY

Various embodiments are directed to a semiconductor system capable of scheduling commands in consideration of tFAW restriction and an operating method thereof.

In an embodiment, a semiconductor system may include: a command queue suitable for storing a plurality of requests provided from a host according to rank and bank information of the requests; one or more determination units suitable for determining requests having a same row address in response to row address information of the requests stored in the command queue; an arbitration unit suitable for scheduling the plurality of requests according to internal priorities of the requests; a monitoring unit suitable for providing the rank information and row hit information of the plurality of requests outputted according to the scheduling result of the arbitration unit, to the arbitration unit; a command generation unit suitable for generating a plurality of commands corresponding to and in response to the plurality of requests outputted according to the scheduling result of the arbitration unit; and a semiconductor memory device suitable for performing an internal operation in response to the command, wherein the arbitration unit reschedules the plurality of requests in response to a monitoring result of the monitoring unit and output results of the plurality of determination units, such that all requests inputted during a preset period are processed.

Each of the determination units may determine whether consecutive requests among the plurality of requests stored in the corresponding command queue among the plurality of command queues have the same row address in a same rank, and outputs flag information corresponding to the number of requests having the same row address.

The arbitration unit may include: a first scheduler suitable for scheduling the plurality of requests according to the Internal priorities, wherein the internal priority is determined by scoring QOS (Quality of Service), seniority, and row hit values of the respective requests; a selector suitable for selecting flag information corresponding to the input sequence of the plurality of requests among the flag information outputted from the plurality of determination units, in response to the monitoring result of the monitoring unit, and outputting the plurality of requests stored in the corresponding command queue; and a second scheduler suitable for rescheduling the requests in response to the monitoring result of the monitoring unit, such that a request having different rank information from the previously-inputted requests is preferentially processed.

The monitoring unit may receive tFAW (Four-bank activation window) information corresponding to the preset period from an external device.

The plurality of requests may provide from the host comprise a request for a read or write operation of the semiconductor memory device.

The semiconductor memory device may have a multi-rank structure including two or more ranks.

The command queue may include a plurality of command queues suitable for storing the plurality of requests according to the rank and bank information of the respective requests, and each of the command queues stores the plurality of requests containing the row address information.

The command queue may include an address mapping unit suitable for receiving a request provided from the host and converting a physical address corresponding to the request into a logical address.

In an embodiment, an operating method of a semiconductor system may include: receiving a plurality of requests from a host and storing the received requests in a command queue; determining the number of requests having a same row address in response to row address information of the requests stored in the command queue; scheduling the plurality of requests according to internal priorities of the requests; generating a window according to the plurality of requests outputted by the scheduling of the plurality of requests, and monitoring rank information and row hit information of the plurality of requests; rescheduling the plurality of requests according to the monitoring result and the number of requests having the same row address, such that all requests inputted during a preset period are processed; generating a command corresponding to the rescheduled requests; and performing an Internal operation of the semiconductor memory device in response to the command.

Monitoring the rank information and row hit information of the plurality of requests may include: generating a first window in response to a first request among the plurality of requests; updating counting information and the row hit information by generating a second window in response to a second request among the plurality of requests, and monitoring whether three consecutive requests to be inputted following the second request have a same rank information and a same row address information; updating the counting information and row hit information by generating a third window in response to a third request among the plurality of requests, and monitoring whether two consecutive requests to be inputted following the third request have the same rank information and low address information; and updating the counting information and row hit information by generating a fourth window in response to a fourth request among the plurality of requests, and monitoring whether two consecutive requests to be inputted following the fourth request have the same rank information and row address information.

Rescheduling the plurality of requests may include determining whether to process the second request and three requests to be inputted following the second request based on whether the corresponding requests have the same rank information and row address information, in response to the monitoring result for the second request.

Rescheduling the plurality of requests may include determining whether to process the third request and two requests to be inputted following the third request based on whether the corresponding requests have the same rank information and row address information, in response to the monitoring result for the third request.

Rescheduling the plurality of requests may include determining whether to process the fourth request and two requests to be inputted following the fourth request based on whether the corresponding requests have the same rank information and row address information, in response to the monitoring result of the fourth request.

Rescheduling the plurality of requests may include controlling another request to be processed, the another request having different rank information from the rank information of the fourth request, when the fourth request and the two requests to be inputted following the fourth request have different rank information and row address information, according to the monitoring result of the fourth request.

Rescheduling the plurality of requests may further include processing all requests inputted to the window, when a row hit value of the row hit information is equal to or more than 2 or the number of requests having different rank information is equal to or more than 2, according to the monitoring result for the rank information and row hit information of the plurality of requests.

The counting information monitored by the window may be reset after a preset number of requests are inputted.

Scheduling the plurality of requests according to the internal priorities may comprise scheduling the plurality of requests according to the internal priorities determined by scoring QOS (Quality of Service), seniority, and row hit values of the respective requests.

The plurality of requests outputted by the scheduling of the plurality of requests may include information on the number of requests having the same row address.

The plurality of requests from the host may comprise a request for a read or write operation of the semiconductor memory device.

DETAILED DESCRIPTION

Figure 1:
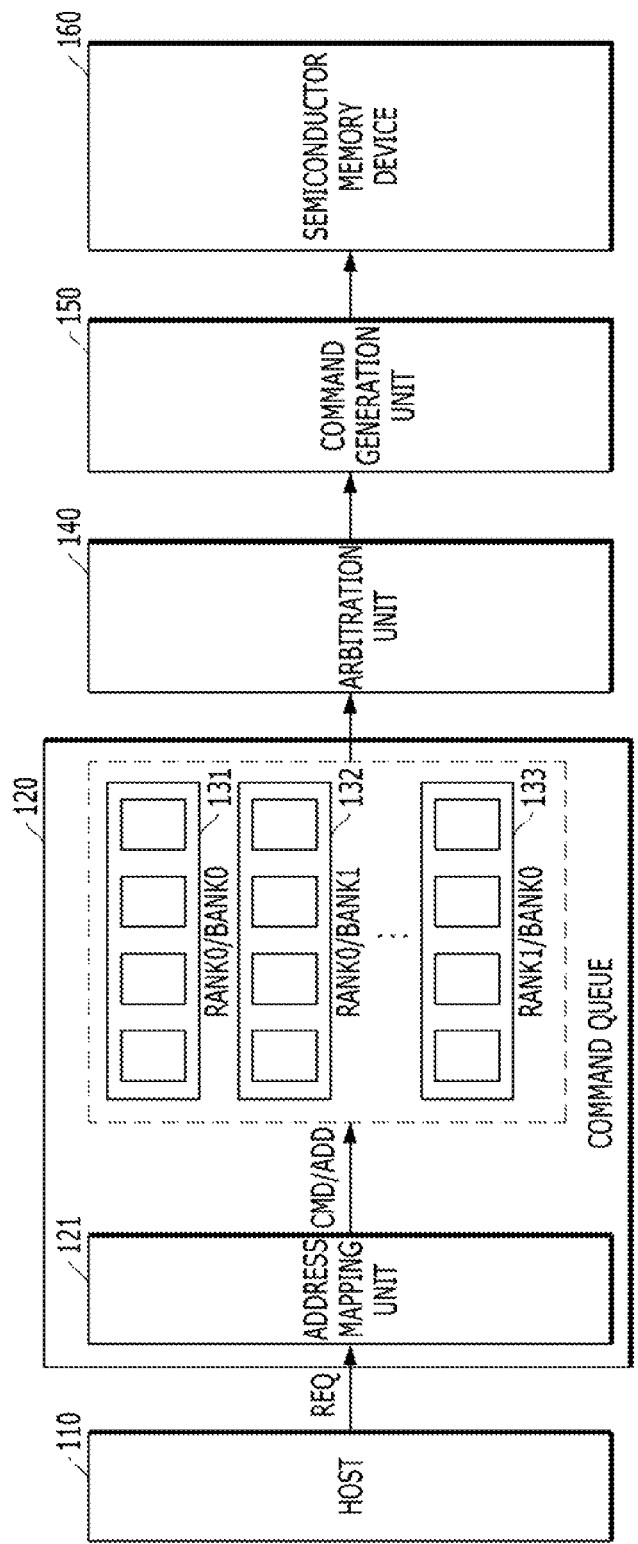
FIG. 1 is a configuration diagram Illustrating a conventional semiconductor system.

Various embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete. Throughout the disclosure, like reference numerals refer to like parts throughout the various figures and embodiments of the present invention.

Figure 2:
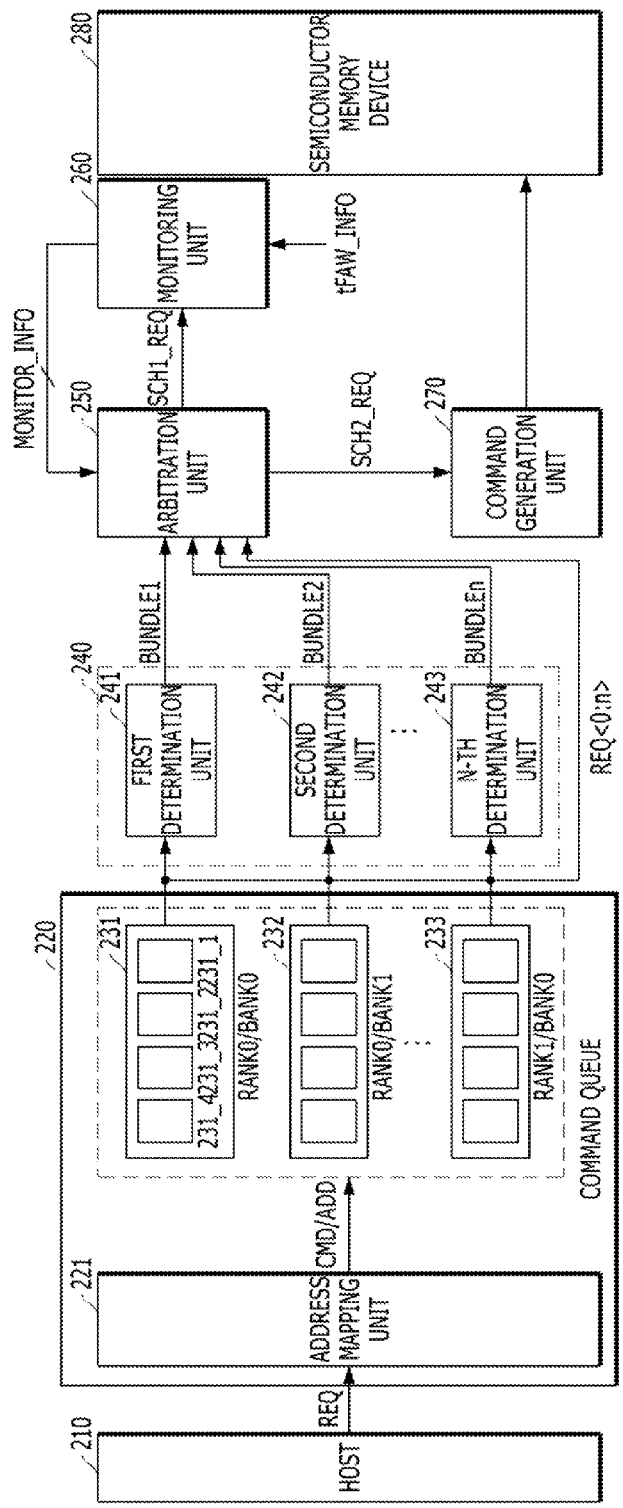
FIG. 2 is a configuration diagram of a semiconductor system, according to an embodiment of the present invention.

Referring to FIG. 2, a semiconductor system, according to an embodiment of the present invention, may include a host 210, a command queue 220, a plurality of determination units 240, an arbitration unit 250, a monitoring unit 260, a command generation unit 270, and a semiconductor memory device 280.

The command queue 220, the plurality of determination units 240, the arbitration unit 250, the monitoring unit 260, and the command generation unit 270 may be incorporated in one memory controller. However, may not be limited in this way. Many other configurations may be envisaged by the skilled person after having read the present disclosure. For example, the command queue 220, the plurality of determination units 240, the arbitration unit 250, the monitoring unit 260, and the command generation unit 270 may be incorporated in two or more memory controllers.

The semiconductor memory device 280 may have a multi-rank structure. A multi-rank structure may include a plurality of ranks each of the ranks having a plurality of banks. In the present embodiment, we suppose that the semiconductor memory device 280 may have two ranks RANK0 and RANK1. However, that any suitable multi-rank structure may be used.

The host 210 may transmit a plurality of requests REQ for controlling the semiconductor memory device 280 to the command queue 220. The plurality of requests REQ may correspond to a plurality of commands including read and/or or write operation commands to be performed on the semiconductor memory device 280.

The command queue 220 may include an address mapping unit 221. The command queue 220 may include a plurality of command queues 231 to 233.

The address mapping unit 221 may receive the plurality of requests REQ from the host 210. The address mapping unit 221 may convert physical addresses corresponding to each of the received requests REQ into logical addresses. For example, the address mapping unit 221 may perform an XOR operation on the physical addresses and corresponding key data. The addresses outputted from the address mapping unit 221 may include commands and/or addresses CMD/ADD. The addresses ADD may include rank, bank, column, and row addresses. The commands and/or addresses CMD/ADD illustrated in FIG. 2 may include not an actual command to be inputted to the semiconductor memory device 280, but requests having command and address information required for generating the actual command.

The plurality of command queues 231 to 233 may receive the requests containing the commands and/or addresses CMD/ADD outputted from the address mapping unit 221, and sequentially store the received requests. The plurality of command queues 231 to 233 may be configured according to the ranks RANK and banks BANK, and each of the command queues 231 to 233 may store four of the requests. The requests may be sequentially stored starting from a far left side of the command queue and then shifting one block to the right each time a new request is entered. Although the present embodiment exemplifies that the plurality of command queues 231 to 233 may be classified by their respective ranks and banks, it is noted that this is only for demonstrating the relationship between the requests and the respective ranks and banks because the semiconductor memory device 280 includes the ranks and the banks. It is noted, however, that the present invention may not be limited thereto and other configurations may be envisaged by those skilled in the art.

The plurality of determination units 240 may identify requests having the same row address, based on the row address information of the plurality of requests stored in the respective command queues 231 to 233. For example, the determination units 240 may determine whether consecutive requests among the plurality of requests stored in the respective command queues 231 to 233 have the same row address. If so, the determination units 240 may output flag information and request information corresponding to the requests having the same row address. For example, when three consecutive requests 231_1 to 231_3 among four requests stored in the first command queue 231 among the plurality of command queues 231 to 233 have the same row address, the first determination unit 241 among the plurality of determination units 240 may output flag information of '3' indicating that the three consecutive requests are in a bundle, and request information on the three consecutive requests 231_1 to 231_3.

The output signals of the respective determination units 241 to 243 may not be simultaneously outputted into the arbitration unit 250. The output signals of the respective determination units 241 to 243 may be sequentially outputted into the arbitration unit 250.

The arbitration unit 250 may schedule the plurality of requests which are sequentially received from the plurality of command queues 231 to 233, based on the priorities of the requests. The priorities may indicate the scoring values of the respective requests. The scoring values may be determined according to the QOS, seniority, and row hit information of the requests, for example. Furthermore, the first scheduling requests SCH1_REQ which are scheduled by the arbitration unit 250 and outputted to the monitoring unit 260 may include flag and request information outputted from the plurality of determination units 240.

The monitoring unit 260 may monitor the request Information on the plurality of requests which are scheduled according to the priorities and sequentially outputted by the arbitration unit 250. The monitoring unit 260 may receive tFAW information tFAW_INFO in order to determine the tFAW restriction, and set a window whenever one request is inputted. A monitoring operation of the monitoring unit 260 will be described with reference to FIG. 3.

Figure 3:
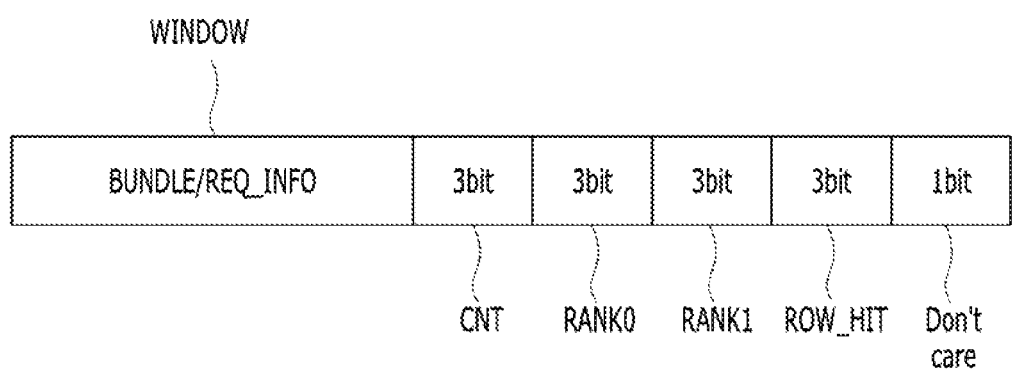
FIG. 3 is a diagram illustrating an example of a window of a monitoring unit that may employed with the semiconductor system of FIG. 2, according to an embodiment of the present invention.

FIG. 3 is a diagram illustrating a window of the monitoring unit 260 according to an embodiment of the present invention.

Referring to FIG. 3, the monitoring unit 260 may set one window WINDOW whenever a request is inputted. The window WINDOW may be used for recognizing the properties of six requests which can be activated based on the tFAW information tFAW_INFO. For example, the window WINDOW may include the flag information and request information BUNDLE/REQ_INFO outputted from the determination unit 240, a counting value CNT obtained by counting previously-processed requests, rank information RANK0 or RANK1 for determining the number of requests for the first or second rank RANK0 or RANK1 among the previously processed requests, a row hit value ROW_HIT for checking how many row hits occurred, and a don't-care flag Don't_care.

The counting value CNT may have a value from zero (0) to six (6). If the number of previously inputted requests is 6, the counting value CNT becomes 6. And then, the counting value CNT may be reset to 0.

The don't-care flag Don't_care may be set to 1 when the numbers of requests for the first and second ranks RANK0 and RANK1 are equal to or more than 2 or the row hit value ROW_HIT is equal to or more than 2. For example, when the don't-care flag Don't_care is set to 1, it may indicate that the operation can be performed by the previous scheduling method even though any requests are inputted afterwards. The reason why the don't-care flag Don't_care becomes 1 when the numbers of requests for the first and second ranks RANK0 and RANK1 are equal to or more than 2 is that the requests may be not affected by the tFAW restriction when the requests correspond to different ranks, respectively. For example, when two or more requests for different ranks are made in a situation where six requests can enter one window, the requests may be free from the tFAW restriction. Furthermore, the reason why the don't-care flag Don't_care is set to 1 when the row hit value ROW_HIT is equal to or more than 2 is that three requests may be processed by one activation when the row hit value ROW_HIT is equal to or more than 2. Thus, since six requests may be processed only by four activations, the requests may be free from the tFAW restriction.

When the don't-care flag Don't_care is 0, the monitoring unit 260 may determine whether the requests are free from the tFAW restriction, based on the flag information BUNDLE outputted from the determination units 240. For example, according to the sequence of the requests inputted to the window WINDOW, the monitoring unit 260 may determine whether to give priority to a request having certain flag information BUNDLE. The flag information BUNDLE may indicate the number of request bundles having the same row address among consecutive requests. This will be described in more detail with reference to FIG. 4.

Figure 4:
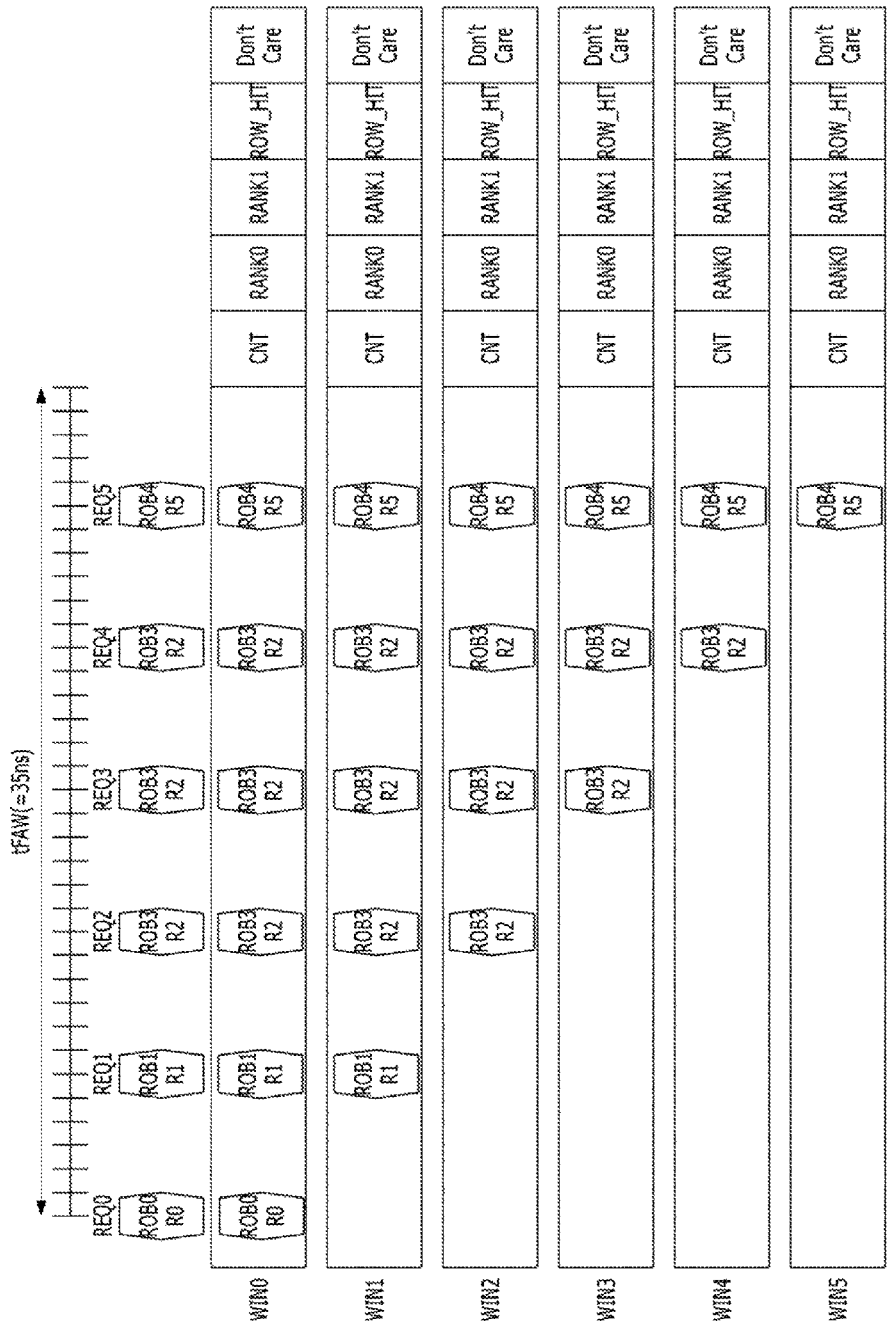
FIG. 4 is a diagram illustrating that windows may be sequentially generated in response to requests inputted to a window illustrated in FIG. 3, according to an embodiment of the present invention.

FIG. 4 is a diagram illustrating that windows may be sequentially generated in response to requests inputted to a window, according to an embodiment of the present invention.

Referring to FIG. 4, six requests REQ0 to REQ5 may be inputted to one window WINDOW during tFAW (=35 ns). Whenever each request is inputted, a new window may be additionally generated.

First, when the first request REQ0 having information on the first rank, the first bank, and the first row address R0B0R0 is inputted, a first window WIN0 may be generated. Since the first request REQ0 is the first input request, the counting value CNT, the first rank number RANK0, the second rank number RANK1, the row hit value ROW_HIT, and the don't-care flag Don't_care may be set to 0.

Then, when the second request REQ1 having information on the first rank, the second bank, and the second row address R0B1R1 is inputted, a second window WIN1 may be generated. The counting value CNT may be set to 1. Since the previously inputted first request REQ0 has information on the first rank, the first bank, and the first row address R0B0R0, the first rank information RANK0 may be set to 1, and the second rank number RANK1 may be set to 0. Furthermore, since the second request REQ1 is a request for a different bank and different row address from the first request REQ0, the row hit value ROW_HIT may be set to 0. The flag information BUNDLE generated from the determination unit 240 may be inputted together with the second request REQ1. The monitoring unit 260 may determine whether the flag information BUNDLE is 4. Then, when the flag information BUNDLE is 4, three requests to be inputted afterwards may be processed by one activation. In the present embodiment, however, not all of the second request REQ1 and three requests to be inputted after the second request REQ1, that is, the third to fifth requests REQ2 to REQ4 may have the same bank information. Thus, the flag information BUNDLE may not be set to 4. However, since the first and second requests REQ0 and REQ1 are not against the tFAW restriction, the corresponding requests may be processed.

After the second request REQ1 is processed, a third window WIN2 may be generated when the third request REQ2 having information on the first rank, the fourth bank, and the third row address R0B3R2 is inputted. The counting value CNT may be set to 2. Since the previously-inputted first and second requests REQ0 and REQ1 have information on the first rank, the first rank number RANK0 may be set to 2, and the second rank number RANK1 may be maintained at 0. Furthermore, since the third request REQ2 is a request for a different bank from the second request REQ1, the row hit value ROW_HIT may be maintained at 0. At this time, the monitoring unit 260 may determine whether the flag information BUNDLE inputted together with the third request REQ2 is 3. Then, when the flag information BUNDLE is 3, two requests to be inputted afterwards may be processed by one activation. In the present embodiment, the third request REQ2 and the fourth and fifth requests REQ3 and REQ4 which are two requests to be inputted following the third request REQ2 may have the same bank information and the same row address. Thus, the flag information BUNDLE may be set to 3. For example, since all of the third to fifth requests REQ2 to REQ4 have the same information on the first rank, the fourth bank, and the third row address R0B3R2, the flag information BUNDLE may be set to 3. Thus, since the fourth and fifth requests REQ3 and REQ4 inputted following the third request REQ2 are inputted according to the previous scheduling result, the fourth and fifth requests REQ3 and REQ4 will be sequentially processed.

However, when the third to fifth requests REQ2 to REQ4 have different row address information, the flag information BUNDLE may not be set to 3. However, since the requests are not against the tFAW restriction at the time that the third request REQ2 is inputted, the corresponding requests may be normally processed.

After the third request REQ2 is processed, a fourth window WIN3 may be generated when the fourth request REQ3 having information on the first rank, the fourth bank, and the third row address R0B3R2 is inputted. The counting value CNT may be set to 3. Since all of the previously-inputted first to third requests REQ0 to REQ2 have the information on the first rank, the first rank number RANK0 may be set to 3, and the second rank number RANK1 may be maintained at 0. Since the third and fourth requests REQ2 and REQ3 have the same row address information along with the same bank information, the row hit value ROW_HIT may be set to 1. Otherwise, the row hit value ROW_HIT may be maintained at 0. At this time, the flag information BUNDLE may be inputted together with the fourth request REQ3. The monitoring unit 260 needs to determine whether the flag information BUNDEL is 3. As described above, the monitoring unit 260 checked whether the flag information BUNDLE was 3 when the third request REQ2 was inputted. The monitoring unit 260 also checks whether the flag information BUNDLE is 3, when the fourth request REQ3 is inputted. The reason to check whether the flag information BUNDLE is 3 is that, when it is assumed that all of the previously-inputted first to third requests REQ0 to REQ2 have different row addresses with one another, three activations were already performed and there is only one chance to perform the activation. Thus, the monitoring unit 260 needs to check whether the flag information BUNDLE inputted together with the fourth request REQ3 is 3. In the present embodiment, not all of the fourth request REQ3 and the fifth and sixth requests REQ4 and REQ5 inputted following the fourth request REQ3 have the same bank information. Thus, the flag information BUNDLE may not be set to 3. In this case, when the fourth request REQ3 is processed according to the previous scheduling method, the fifth and sixth requests REQ4 and REQ5 inputted following the fourth request REQ3 may not be processed due to the tFAW restriction. Therefore, the arbitration unit 250 may control not to process the fourth request REQ3, but to preferentially process another request having the second rank information among the plurality of requests stored in the plurality of command queues 231 to 233. The preferentially-processed request having the second rank information may become a request having a higher priority according to the scheduling method of the arbitration unit 250.

In the present embodiment, the arbitration unit 250 may perform a scheduling operation such that the fourth request REQ3 may be not processed due to the tFAW restriction but requests having different rank information, that is, the second rank information may be preferentially processed, in order not to violate the tFAW restriction. Then, in the situation free from the tFAW restriction, the arbitration unit 250 may receive the unprocessed requests, that is, the fourth to sixth requests REQ3 to REQ5 to perform the monitoring again, and control the requests to be processed at the time that the requests can be processed.

As such, the monitoring unit 260 may generate a new window whenever each of the plurality of requests is inputted. According to the situations of the currently-inputted request and the previously-inputted requests, the monitoring unit 260 may monitor the counting values CNT, the first rank numberRANK0, the second rank number RANK1, the row hit values ROW_HIT, and the don't-care flags Don't_care of the requests.

The counting value CNT for a window generated whenever a request is inputted may be reset to 0 after six requests are received. Then, the monitoring unit 260 may receive and monitor a new request. Although, for the sake of understanding, it is described in the present embodiment that requests may be stored in a window at the time that the requests are inputted, the requests for all windows may be sequentially stored from the beginning, like the first window WIN0.

Referring back to FIG. 2, the monitoring unit 260 may include the window configured as illustrated in FIG. 3 to monitor information on the corresponding request as illustrated in FIG. 4, and output the monitoring result to the arbitration unit 250.

The arbitration unit 250 may process the previously-scheduled requests based on the monitoring result of the monitoring unit 260. Alternately, when the situation is against the tFAW restriction, for example, when the flag information BUNDLE of the fourth request REQ3 among the first to sixth requests REQ0 to REQ5 which are sequentially inputted is not 3 or the row hit values ROW_HIT of all the requests are less than 2, the arbitration unit 250 may select requests having necessary flag information according to the input sequence of the requests, or perform a rescheduling operation such that requests having different rank information may be preferentially processed. Thus, the rescheduled second scheduling requests SCH2_REQ may be sequentially outputted and, then, inputted to the command generation unit 270. The operation of the arbitration unit 250 will be described in more detail with reference to FIG. 5.

The command generation unit 270 may generate a command corresponding to the rescheduled requests which are outputted from the arbitration unit 250. The rescheduled requests may include requests corresponding to a command for read or write operation of the semiconductor memory device.

The semiconductor memory device 280 may perform a command operation corresponding to the command outputted from the command generation unit 270.

Figure 5:
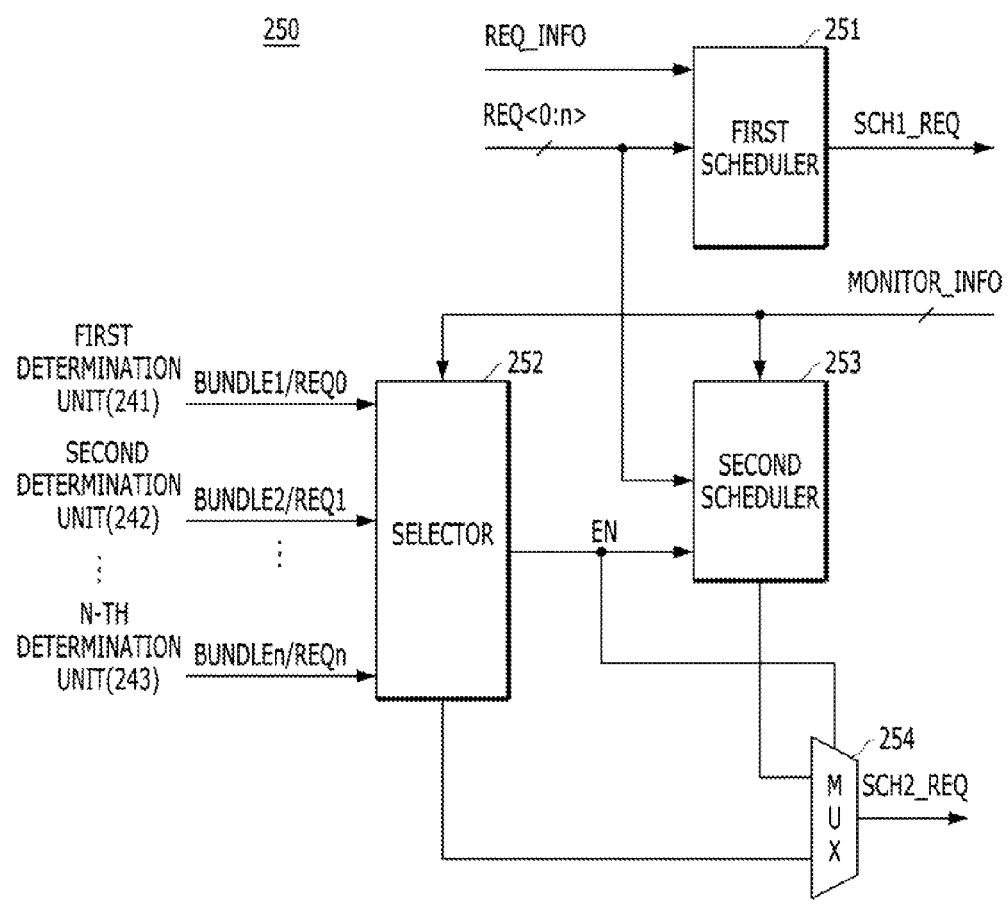
FIG. 5 is a configuration diagram illustrating an example of an arbitration unit 250 of FIG. 2, according to an embodiment of the present invention.

FIG. 5 is a configuration diagram illustrating the arbitration unit 250 according to an embodiment of the present invention.

Referring to FIGS. 2 and 5, the arbitration unit 250 may include a first scheduler 251, a selector 252, a second scheduler 253, and a MUX 254.

The first scheduler 251 may schedule a plurality of requests REQ<0:n> which are sequentially outputted from the plurality of command queues 231 to 233, according to the request information REQ_INFO of the requests REQ<0:n>. The request information REQ_INFO may indicate the scoring values of the respective requests. The scoring values may be determined according to the QOS, seniority, and row hit information of the requests, for example. The first scheduling requests SCH1_REQ scheduled by the first scheduler 251 may be inputted to the monitoring unit 260.

The selector 252 may output a request from a determination unit having the flag information required at the time that the request is inputted, of flag information BUNDLE1 to BUNDLEn outputted from the plurality of determination units 241 to 243, according to the monitoring result MONITOR_INFO of the monitoring unit 260. For example, when a request is inputted, the monitoring unit 260 may check necessary flag information at the time that the request is inputted, according to the input sequence of the requests. For example, when the second request REQ1 is inputted, the flag information required at this time point may correspond to 4. At this time, the selector 252 may select flag information having a value of 4 among the flag information BUNDLE1 to BUNDLEn outputted from the respective determination units 241 to 243, and output a request from the command queue corresponding to the corresponding determination unit. Similarly, when the third request REQ2 is inputted, flag information having a value of 3 may be required. When the fourth request REQ3 is inputted, flag information having a value of 2 may be required. As such, the selector 252 may select necessary flag information according to the input sequence of the requests, and sequentially output requests from the command queue corresponding to the corresponding determination unit.

The selector 252 may generate an enable signal EN to activate the second scheduler 253 when there is no flag information corresponding to the input sequence of the request according to the monitoring result MONITOR_INFO of the monitoring unit 260.

When there is no flag information corresponding to the input sequence of the request according to the monitoring result MONITOR_INFO of the monitoring unit 260, the second scheduler 253 may perform a rescheduling operation such that requests having different rank information may be preferentially outputted in response to the enable signal EN. For example, when all of the first to fourth requests REQ0 to REQ3 have the first rank information RANK0 together with different bank information and different row addresses, the tFAW restriction may be violated because four activations were already performed. Thus, the second scheduler 253 may perform a rescheduling operation for the next requests such that a request having different rank information, for example, the second rank information RANK1 may be preferentially processed.

The MUX 254 may be configured to output any one of the request output from the selector 252 or the request output from the second scheduler 252 as the second scheduling requests SCH2_REQ in response to the enable signal EN.

In short, the semiconductor system according to the embodiment of the present invention may schedule a plurality of requests transmitted from the host 210 based on priorities depending on the scoring values of the respective requests or the QOS, seniority, and row-hit information of the respective requests. The semiconductor system may reschedule the requests such that the requests may be not against the tFAW restriction. Thus, the semiconductor system may process all of the requests. Therefore, the semiconductor system can prevent a performance overhead which had occurred when two commands of six commands were not processed due to the tFAW restriction.

Although various embodiments have been described for illustrative purposes, it will be apparent to those skilled in the art that various changes and modifications may be made without departing from the spirit and scope of the invention as defined in the following claims.

What is claimed is:

1. A semiconductor system comprising:
   a command queue suitable for storing a plurality of requests provided from a host according to rank and bank information of the requests;
   one or more determination units suitable for determining requests having a same row address in response to row address information of the requests stored in the command queue;
   an arbitration unit suitable for scheduling the plurality of requests according to internal priorities of the requests;
   a monitoring unit suitable for providing the rank information and row hit information of the plurality of requests outputted according to the scheduling result of the arbitration unit, to the arbitration unit;
   a command generation unit suitable for generating a plurality of commands corresponding to and in response to the plurality of requests outputted according to the scheduling result of the arbitration unit; and
   a semiconductor memory device suitable for performing an internal operation in response to the command,
   wherein the arbitration unit reschedules the plurality of requests in response to a monitoring result of the monitoring unit and output results of the plurality of determination units, such that all requests inputted during a preset period are processed,
   wherein each of the determination units determines whether consecutive requests among the plurality of requests stored in the corresponding command queue among the plurality of command queues have the same row address in a same rank, and outputs flag information corresponding to the number of requests having the same row address.

2. The semiconductor system of claim 1, wherein the arbitration unit comprises:
   a first scheduler suitable for scheduling the plurality of requests according to the internal priorities, wherein the internal priority is determined by scoring QOS (Quality of Service), seniority, and row hit values of the respective requests;
   a selector suitable for selecting flag information corresponding to the input sequence of the plurality of requests among the flag information outputted from the plurality of determination units, in response to the monitoring result of the monitoring unit, and outputting the plurality of requests stored in the corresponding command queue; and
   a second scheduler suitable for rescheduling the requests in response to the monitoring result of the monitoring unit, such that a request having different rank information from the previously-inputted requests is preferentially processed.

3. The semiconductor system of claim 1, wherein the monitoring unit receives tFAW (Four-bank activation window) information corresponding to the preset period from an external device.

4. The semiconductor system of claim 1, wherein the plurality of requests provided from the host comprise a request for a read or write operation of the semiconductor memory device.

5. The semiconductor system of claim 1, wherein the semiconductor memory device has a multi-rank structure including two or more ranks.

6. The semiconductor system of claim 1, wherein the command queue comprises a plurality of command queues suitable for storing the plurality of requests according to the rank and bank information of the respective requests, and
   each of the command queues stores the plurality of requests containing the row address information.

7. The semiconductor system of claim 1, wherein the command queue comprises an address mapping unit suitable for receiving a request provided from the host and converting a physical address corresponding to the request into a logical address.

8. An operating method of a semiconductor system including a semiconductor memory device, comprising:
   receiving a plurality of requests from a host and storing the received requests in a command queue;
   determining the number of requests having a same row address in response to row address information of the requests stored in the command queue;
   scheduling the plurality of requests according to internal priorities of the requests;
   generating a window according to the plurality of requests outputted by the scheduling of the plurality of requests, and monitoring rank information and row hit information of the plurality of requests;
   rescheduling the plurality of requests according to the monitoring result and the number of requests having the same row address, such that all requests inputted during a preset period are processed;
   generating a command corresponding to the rescheduled requests; and
   performing an internal operation of the semiconductor memory device in response to the command,
   wherein scheduling the plurality of requests according to the internal priorities comprises scheduling the plurality of requests according to the internal priorities determined by scoring QOS (Quality of Service), seniority, and row hit values of the respective requests.

9. The operating method of claim 8, wherein monitoring the rank information and row hit information of the plurality of requests comprises:
   generating a first window in response to a first request among the plurality of requests;
   updating counting information and the row hit information by generating a second window in response to a second request among the plurality of requests, and monitoring whether three consecutive requests to be inputted following the second request have a same rank information and a same row address information;

updating the counting information and row hit information by generating a third window in response to a third request among the plurality of requests, and monitoring whether two consecutive requests to be inputted following the third request have the same rank information and low address information; and updating the counting information and row hit information by generating a fourth window in response to a fourth request among the plurality of requests, and monitoring whether two consecutive requests to be inputted following the fourth request have the same rank information and row address information.

10. The operating method of claim 9, wherein rescheduling the plurality of requests comprises determining whether to process the second request and three requests to be inputted following the second request based on whether the corresponding requests have the same rank information and row address information, in response to the monitoring result for the second request.

11. The operating method of claim 9, wherein rescheduling the plurality of requests comprises determining whether to process the third request and two requests to be inputted following the third request based on whether the corresponding requests have the same rank information and row address information, in response to the monitoring result for the third request.

12. The operating method of claim 9, wherein rescheduling the plurality of requests comprises determining whether to process the fourth request and two requests to be inputted following the fourth request based on whether the corresponding requests have the same rank information and row address information, in response to the monitoring result of the fourth request.

13. The operating method of claim 12, wherein rescheduling the plurality of requests comprises controlling another request to be processed, the another request having different rank information from the rank information of the fourth request, when the fourth request and the two requests to be inputted following the fourth request have different rank information and row address information, according to the monitoring result of the fourth request.

14. The operating method of claim 9, wherein rescheduling the plurality of requests further comprises processing all requests inputted to the window, when a row hit value of the row hit information is equal to or more than 2 or the number of requests having different rank information is equal to or more than 2, according to the monitoring result for the rank information and row hit information of the plurality of requests.

15. The operating method of claim 9, wherein the counting information monitored by the window is reset after a preset number of requests are inputted.

16. The operating method of claim 8, wherein the plurality of requests outputted by the scheduling of the plurality of requests comprise information on the number of requests having the same row address.

17. The operating method of claim 8, wherein the plurality of requests from the host comprise a request for a read or write operation of the semiconductor memory device.

* * * * *